United States Patent
Zohar et al.

(10) Patent No.: US 7,539,815 B2
(45) Date of Patent: May 26, 2009

(54) METHOD, SYSTEM AND CIRCUIT FOR MANAGING TASK QUEUES IN A DISK DEVICE CONTROLLER

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shermer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 11/165,976

(22) Filed: Jun. 24, 2005

(65) Prior Publication Data

US 2006/0294301 A1 Dec. 28, 2006

Related U.S. Application Data

(60) Provisional application No. 60/639,780, filed on Dec. 29, 2004.

(51) Int. Cl.
*G06F 13/14* (2006.01)
(52) U.S. Cl. ......................... 711/112; 710/52
(58) Field of Classification Search ................. 711/112; 710/52
See application file for complete search history.

(56) References Cited

U.S. PATENT DOCUMENTS

| | | | | | |
|---|---|---|---|---|---|
| 4,530,055 | A | * | 7/1985 | Hamstra et al. | 711/136 |
| 5,561,823 | A | * | 10/1996 | Anderson | 710/52 |
| 5,895,488 | A | * | 4/1999 | Loechel | 711/135 |
| 6,189,080 | B1 | * | 2/2001 | Ofer | 711/167 |
| 7,191,207 | B2 | * | 3/2007 | Blount et al. | 709/200 |
| 2003/0105928 | A1 | * | 6/2003 | Ash et al. | 711/136 |
| 2003/0212865 | A1 | * | 11/2003 | Hicken et al. | 711/135 |

OTHER PUBLICATIONS

Grant Smith, tutorial6, Jun. 6, 2004, retreived from internet Aug. 1, 2008 [url: http://web.archive.org/web/20040606011726/http://www.cprogramming.com/tutorial/tut6.html].*

* cited by examiner

*Primary Examiner*—Kevin L Ellis
*Assistant Examiner*—Jared I Rutz
(74) *Attorney, Agent, or Firm*—Griffiths & Seaton PLLC

(57) ABSTRACT

In accordance with further embodiments of the present invention, there is provided a disk controller for managing the delegation of tasks from a disk controller to a disk, including a task delegation module adapted to delegate fetch or destage tasks to the disk in accordance with a relation between an amount of dirty data currently in a cache and a number of pending destage tasks currently being handled by the disk.

6 Claims, 6 Drawing Sheets

| Ratio between the amount of dirty data in the cache(s) and the dirty data threshold | Number of destage tasks being handled by the disk(s) | Number of destage tasks to be delegated to the disk(s) |
|---|---|---|
| <25% | 0 | 1 |
| | 1 | 0 |
| | 2 | 0 |
| | 3 | 0 |
| >25% and <50% | 0 | 1 |
| | 1 | 1 |
| | 2 | 0 |
| | 3 | 0 |
| >50% and <75% | 0 | 1 |
| | 1 | 1 |
| | 2 | 1 |
| | 3 | 1 |
| >75% and ≤100% | 0 | 2 |
| | 1 | 2 |
| | 2 | 1 |
| | 3 | 1 |

FIG. 2

METHOD, SYSTEM AND CIRCUIT FOR MANAGING TASK QUEUES IN A DISK DEVICE CONTROLLER

CROSS REFERENCE TO RELATED APPLICATIONS

This application claims priority to provisional application No. 60/639,780, filed on Dec. 29, 2004, the contents of which are herein wholly incorporated by reference.

FIELD OF THE INVENTION

The present invention relates generally to the field of mass-storage. More specifically, the present invention relates to a system, method and circuit for controlling the delegation of tasks to the disk.

BACKGROUND OF THE INVENTION

In mass-storage systems it is known to use a disk controller device to manage the delegation of tasks onto the disk or disks associated with the controller. Commonly, in order to fetch data from the disk or in order to destage data into the disk, appropriate tasks are generated by the components of the mass-storage system, for example by one or more disk controllers that may or may not be part of caches. The disk controller is responsible for managing the delegation of the fetch or the destage tasks to the disk(s). At any given time, the disk controller may be simultaneously handling many tasks of both kinds. In order to control the order by which the tasks are forwarded to the disk, the disk controller employs queue management algorithms and/or hardware. The order by which the fetch and destage tasks are forwarded to the disk, may influence the mass-storage system's performance, as will be briefly discussed below.

A fetch task is configured to instruct the disk to bring into the cache a specific segment of data. Fetch tasks may be generated by a cache or by any other suitable component of the mass-storage system, for example, in response to a "read" service request. In order to complete the servicing of the read request, all the requested data must have been retrieved from the disk and stored either in the cache (whether fetched or already in the cache) or in the interfaces. Thus delays in completing fetch tasks directed at the disks may have a significant negative influence on the overall performance of the system.

A destage task is configured to cause the disk to receive and store a certain segment of data which is temporarily stored in the cache. Destage tasks may be associated, for example, with "write" requests, and may be generated by a cache following the temporary storage of the data associated with the write request in the cache. The temporary storage of the data in the cache associated with the write request, enables the mass-storage system to avoid having to wait for the completion of the substantially lengthy process of storing the data in the disk before acknowledging the request. In addition, by enabling the cache to acknowledge the write request prior to the data being stored in the disk, the controller may choose to delay one or more destage tasks, and to prioritize one or more fetch tasks that must be completed in order for the corresponding read requests to be serviced.

However, destage tasks should not be delayed in an uncontrolled and categorical manner, since if too much destage-pending data, also known as "dirty data", is allowed to be accumulated in the cache, the cache's performance may gradually diminish, and the system's performance may be significantly hampered.

Another aspect of fetch and destage task management, relates to the task management queuing mechanisms which may be employed by the disk device(s). The disk queuing mechanisms receive the fetch and destage tasks from the controller, and implement various task reordering schemes aimed at optimizing the overall performance of the disk device(s). However, once a task reaches the disk's task queue, it is handled exclusively by the disk's queuing mechanisms and the controller or any other component of the mass-storage system may not interfere with the process. As a result, the longer the disk's tasks queue is, the more detached it becomes from events occurring outside the disk. Thus, in general the contribution of the disk's internal queuing mechanisms to the overall performance may gradually decrease inversely to the length of the disk's task queue, and therefore the length of the disk's task queue should be controlled.

These factors should be taken into consideration, in specific, by the controller, when considering which kind of task or tasks and/or what number of each kind of tasks should be delegated to the disk(s) at a given point in time.

Several methodologies, systems and circuits for managing tasks queues are known and have been implemented. Enhancements and improvements to existing cache management and storage solutions are needed.

SUMMARY OF THE INVENTION

Some embodiments of the present invention relate to a system, a method and a device for managing the delegation of tasks from a disk controller to a disk. In accordance with some embodiments of the present invention, there is provided a method of managing the delegation of tasks from a disk controller to a disk, including delegating fetch or destage tasks to the disk in accordance with an amount of dirty data currently in a cache and in accordance with a number of pending destage tasks currently being handled by the disk. In accordance with further embodiments of the present invention, the delegation of fetch or destage tasks to the disk may be in accordance with a relation between the amount of dirty data currently in the cache and a dirty data threshold and in accordance with the number of pending destage tasks currently being handled in the cache.

In accordance with yet further embodiments of the present invention, there is provided a mass-storage system, including one or more cache storage device, one or more disks and one or more disk controllers adapted to manage the delegation of tasks to the disk. In accordance with some embodiments of the present invention, the disk controller(s) may be adapted to delegate fetch or destage tasks to the disk in accordance with an amount of dirty data currently in the cache and a number of pending destage tasks currently being handled by the disk. In accordance with further embodiments of the present invention, the disk controller(s) may be adapted to delegate fetch or destage tasks to the disk in accordance with a relation between the amount of dirty data currently in the cache and a dirty data threshold and in accordance with the number of pending destage tasks currently being handled in the cache.

In accordance with further embodiments of the present invention, there is provided a disk controller for managing the delegation of tasks from a disk controller to a disk, including a task delegation module adapted to delegate fetch or destage tasks to the disk in accordance with a relation between the amount of dirty data currently in the cache and the amount of pending destage tasks currently being handled by the disk.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2 is an illustration of a portion of an exemplary LUT, in accordance with some embodiments of the present invention;

Figure 1:
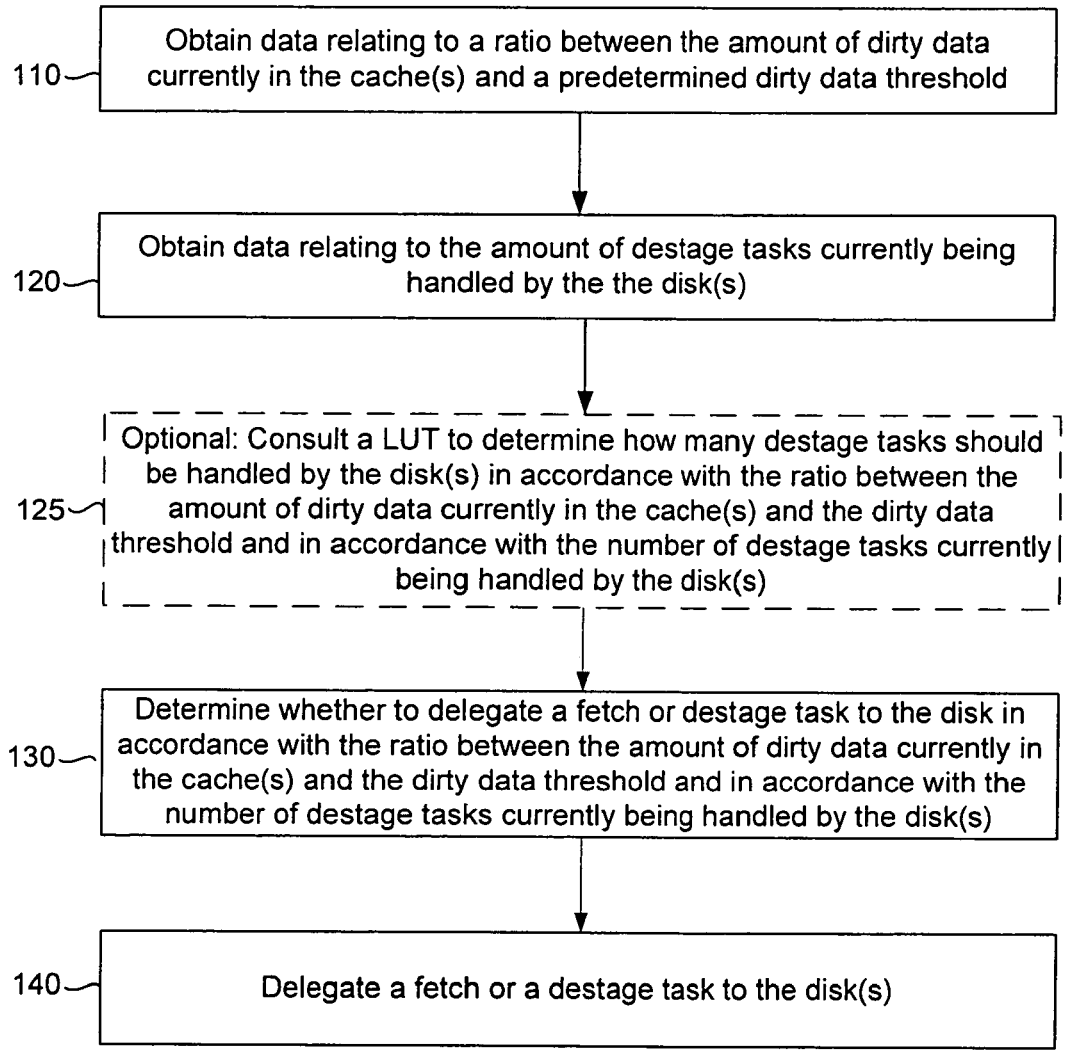
FIG. 1 is a flowchart illustration of a method of managing the delegation of tasks from a cache to a disk, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Reference is now made to FIG. 1, which is a flowchart illustration of a method of managing the delegation of tasks from a cache to a disk, in accordance with some embodiments of the present invention. In accordance with some embodiments of the present invention, the method of managing the delegation of tasks for a cache to a disk may include obtaining data relating to a ratio (or relation) between an amount of dirty data currently in the cache(s) and a dirty data threshold implemented in the storage system (block 110), and obtaining data relating to a number of pending destage tasks currently being handled by the disk(s) (blocks 120), for example, in the disk(s) associated with the cache(s). In accordance with some embodiments of the present invention, the tasks currently being handled by the disk(s) may include tasks which are currently being processed, as well as pending tasks in the disk(s)'s task queue awaiting to be processed.

As explained above, a dirty data threshold may be implemented in the storage system in order to prevent the dirty data from being accumulated in the cache in an uncontrolled manner and to ensure that at any given point in time, there is sufficient available cache storage space which may be used as part of the ongoing activity in the storage system, for example, to fetch into the cache data from the disk(s) as part of servicing fetch tasks, which in case that the cache is full, may not be possible or may be preformed inefficiently.

In FIG. 1, the decision regarding the delegation of fetch and/or destage tasks to the disk is shown to be in accordance with the ratio between the amount of dirty data currently in the cache and a dirty data threshold. However, in accordance with other embodiments of the present invention, data relating to the dirty data threshold may not necessarily be involved in the decision regarding the delegation of tasks to the disk, and the decision regarding the delegation of tasks to the disk may be in accordance with data relating only to the amount of dirty data currently in the cache and in accordance with the number of destage tasks currently being handled by the disks. Nevertheless, as already mentioned, although not limited in this respect, in accordance with some embodiments of the present invention, the decision regarding the delegation of fetch and/or destage tasks to the disk may be arrived at in accordance with the ratio between the amount of dirty data currently in the cache and a dirty data threshold.

It should be noted, that in accordance with some embodiments of the present invention, the total amount of cache storage space in the storage system may vary, and it should be noted, that in accordance with further embodiments of the present invention, the proportion between the total amount of cache storage space and the amount of dirty data which is considered to be the dirty data threshold may change. Thus, in accordance with some embodiments of the present invention, in case that the decision to delegate fetch and/or destage tasks is arrived at in accordance with absolute amounts of dirty data in the cache rather than in accordance with a ratio, these and similar changes may be taken into consideration. For example, the criteria for delegating a destage task to the disk may be modified in case the total amount of cache storage space in the storage system is reduced, such that, for example, once the criteria is adapted, a smaller amount of dirty data in the cache, all other things being equal, may cause the same number of fetch and/or destage tasks to be delegated to the cache.

Accordingly, throughout the specification and the claims, the term "amount of dirty data currently in the cache" and the term "ratio between the amount of dirty data currently in the cache and a dirty data threshold" may be interchanged, unless specifically stated otherwise.

In accordance with some embodiments of the present invention, the data relating to the ratio between the amount of dirty data currently in the cache(s) and the dirty data threshold which may be obtained by the disk controller may correspond, for example, to the percentage of dirty data currently in the cache(s) out of the dirty data threshold. However, it should be noted that the data relating to the ratio between the amount of dirty data currently in the cache(s) and the dirty data threshold may be provided in any suitable form or format. Furthermore, it should be noted that, in accordance with some further embodiments of the present invention, as mentioned above, the data obtained by the disk controller may relate to the amount of dirty data in the cache and the data relating to the dirty data threshold may be obtained separately or may, in some embodiments of the present invention, may be predefined in the disk controller or otherwise determined by the disk controller.

Next, in accordance with some embodiments of the present invention, it may be determined whether to delegate to the disk(s) a fetch or a destage task in accordance with the data relating to the ratio between the amount of dirty data currently in the cache(s) and the dirty data threshold and in accordance with the number of pending destage tasks currently being handled by the cache(s) (block 130). In accordance with further embodiments of the present invention, a fetch task may be delegated to the disk unless it is determined in accordance with a ratio between an amount of dirty data currently in the cache and a dirty data threshold and in accordance with the number of destage tasks currently being handled by the disk(s), that one or more destage tasks should be delegated to the disk(s) 40, either in alternative to the fetch task(s) or in combination with one or more fetch task(s).

In accordance with some embodiments of the present invention, for each combination of a certain ratio between the amount of dirty data currently in the cache(s) and the dirty data threshold (or a certain range of ratios) and of a certain number of destage tasks (or a certain range of numbers) handled by the disks(s) it may be predefined whether to delegate a fetch or a destage tasks to the disk(s). Once it has been determined whether to delegate a fetch or a destage task to the disk(s), the appropriate (fetch or destage) tasks may be forwarded to the disk(s) (block 140).

In accordance with further embodiments of the present invention, more than one task may be substantially simultaneously delegated to the disk(s) as part of a single delegation iteration. Thus, rather than determining whether to delegate to the disk(s) a fetch or a destage task, in accordance with some embodiments of the present invention, it may be determined what number of fetch and/or what number of destage tasks should be delegated to the disk(s) in accordance with the ratio between the amount of dirty data currently in the cache(s) and the dirty data threshold and in accordance with the number of destage tasks currently being handled by the disk(s). In accordance with further embodiments of the present invention, for each combination of a certain ratio (or a certain range of ratios) and of a certain number of destage tasks (or a certain range of numbers) currently being handled by the disks(s), a certain amount of fetch and or a certain amount of destage tasks which should be delegated to the disk(s) may be predefined. In accordance with some embodiments of the present invention, once it has been determined what number of fetch and/or what number of destage tasks to delegate to the disk(s), the appropriate (fetch or destage) tasks may be forwarded to the disk(s). In accordance with some embodiments of the present invention, the number of destage tasks to be delegated to the disk(s) may generally increase with the amount of dirty data in the cache(s) and may generally decrease with the number of destage tasks currently being handled by the cache, as will be explained in more detail below.

In accordance with yet further embodiments of the present invention, it may be determined whether to delegate to the disk(s) a fetch or a destage task in accordance with a result of a function associated with the amount of dirty data currently in the cache(s) or with the ratio between the amount of dirty data currently in the cache and the dirty data threshold and in accordance with the number of destage tasks currently being handled by the disk(s). In accordance with some embodiments of the present invention, it may be determined whether to delegate to the disk(s) a fetch or a destage task in accordance with a relation between a result of a function associated with the ratio between the amount of dirty data currently in the cache and the dirty data threshold and with the number of destage tasks currently being handled by the disk(s). In accordance with further embodiments of the present invention, the number of fetch and/or the number of destage tasks that are to be delegated to the disk(s) as part of a certain delegation iteration may be determined in accordance with a relation between a result of a function associated with the amount of dirty data currently in the cache(s) and the number of destage tasks currently being handled by the disk(s).

In accordance with further embodiments of the present invention, once the data relating to the amount of pending destage tasks currently being handled by the disk(s) is obtained at block 120, and the data relating to the amount of dirty data currently in the cache(s) is obtained at block 110 (or the data relating to the ratio between the amount of dirty data currently in the cache and a dirty data threshold), a LUT (look up table), wherein a predefined delegation result is provided for each combination of a certain amount (or a certain range of amounts) of dirty data in the cache(s) (or of a certain ratio between the amount of dirty data currently in the cache and a dirty data threshold) and a certain number (or a certain range of numbers) of destage tasks in the disk(s), may be consulted to determine whether to delegate a fetch or a destage task to the disk(s) (block 125) or to determine what number of fetch and/or destage task(s) should be delegated to the disk(s).

However, in accordance with other embodiments of the present invention, the disk controller may alternatively be configured to utilize a predefined function configured to return a number of fetch task(s) and/or a number of destage task(s) that should be delegated to the disk(s). The result which may be returned by the predefined function may be based upon a first input value corresponding to the ratio between the amount of dirty data currently in the cache(s) and the dirty data threshold and upon a second input value associated with the number of destage tasks currently being handled by the disk(s). Thus, in accordance with some embodiments of the present invention, the predefined function which may be utilized by the disk controller may include at least a first parameter which may be associated with the ratio between the amount of dirty data currently in the cache(s) and the dirty data threshold and a second parameter which may be associated with the number of destage tasks currently being handled by the disk(s).

It should be noted that the embodiments of the present invention illustrated in FIG. 1 and discussed hereinabove are exemplary in nature, and that, in accordance with further embodiments of the present invention, various aspects of the method of managing the delegation of tasks from a cache to a disk, may be modified and/or enhancements may be included.

Reference is now made to FIG. 2, which is an illustration of a portion of an exemplary LUT, in accordance with some embodiments of the present invention. In accordance with some embodiments of the present invention, the LUT may be used to determine whether a fetch or a destage task should be delegated to the disk(s) and/or the number of fetch and/or destage tasks that should be delegated to the disk(s) in accordance with the amount of dirty data currently in the cache(s) or with the ratio between the amount of dirty data currently in the cache and a dirty data threshold and in accordance with the number of destage tasks currently being handled by the disk(s).

In the exemplary LUT shown in FIG. 2, the LUT includes (from left to right): a column relating to the ratio between the amount of dirty data in the cache(s) and a dirty data threshold; a column relating to the number of destage tasks being handled by the disk(s); and a column relating to the number of destage tasks that should be delegated to the disk(s).

Once the data relating to the ratio between the amount of dirty data currently in the cache(s) and the (current) dirty data threshold and to the number of destage tasks currently being handled by the disk(s) is obtained, the LUT may be consulted to determine whether a fetch or a destage task should be delegated to the disk(s) and/or the number of fetch and/or destage tasks that should be delegated to the disk(s).

For illustration purposes, in the non-limiting embodiment, at a certain point in time, the total cache storage size in the mass-storage system may be 40 GB and the dirty data threshold may be set at, for example, approximately 80% of the total cache storage size or 32 GB, meaning that the amount of dirty data allowed in the cache(s) is up-to 32 GB, as explained above. For convenience purposes, the ratio between the amount of dirty data currently in the cache(s) and the dirty data threshold is provided in incremental segments which correspond to 25%, each, of the dirty data threshold. Accordingly, the amount of dirty data in the cache(s) is provided in segments of 8 GB of dirty data each. However, it should be noted that the present invention is not limited in this respect and that the data in the LUT may be otherwise organized.

The next column to the right in the LUT shown in FIG. 2 relates to the number of destage tasks currently being handled by the disk(s). Here, again for convenience purposes only, the disk is shown to be able to handle up-to 4 tasks at a time. Thus, for each range of ratios provided in the leftmost column of the LUT, the LUT include 4 subentries relating to a certain number ranging from 0 to 3 of destage tasks being handled by the disk(s), such that all the possibilities of interest may be covered (in the embodiments shown in FIG. 2, in case the disk(s) is handling 4 destage tasks, the disk(s)'s task queue is full and the disk may not be allowed to receive additional tasks).

The rightmost column shown in FIG. 2, relates to the number of destage tasks that should be delegated to the disk(s). As can be seen in the LUT shown FIG. 2, the number of destage tasks that should be delegated to the disk(s) is associated with the ratio between the amount of dirty data currently in the cache(s) and the (current) dirty data threshold, and with the number of destage tasks currently being handled by the disk(s). For example, if there is already one destage task currently being handled by the disk, in case that the ratio between the amount of dirty data in the cache and the dirty data threshold is less than 25%, the LUT indicates that no destage tasks should be delegated to the disk. However, for the same number of destage tasks being handled by the disk (one), the LUT indicates that in case the ratio is between 50%-75%, one destage task should be delegated to the disk, and in case the ratio is between 75%-100%, the LUT indicates that two destage tasks should be delegated to the disk. The connection between the number of destage tasks currently being handled by the cache and the number of destage tasks to be delegated to the disks is apparent in FIG. 2.

It would be obvious to those with ordinary skill in the art that it may be desirable to manage the delegation of tasks to the disk, such that dirty data overflow is limited, and if possible, prevented altogether. It would also be obvious to those of ordinary skill in the art, that, in accordance with some embodiments of the present invention, while there is no risk of dirty data overflow, fetch tasks should be given priority. Thus, as is shown in FIG. 2, in accordance with the LUT, the number of destage tasks which should be delegated to the disk(s) may generally increase with an increasing ratio between the amount of dirty data currently in the cache(s) and the dirty data threshold, such that destage tasks may be more aggressively delegated to the disk(s) when the cache is approaching overflow which, as mentioned above, may have a negative effect on the performance of the cache and once the overall performance of the storage system. As is also shown, the number of destage tasks that should be delegated to the disk(s) may also be associated with the amount of destage tasks currently being handled by the disk(s), such that the number of destage tasks which should be delegated to the disk(s) generally decreases with the number of destage tasks currently being handled by the disk(s). The number of destage tasks which should be delegated to the disk(s) may be controlled, such that it generally decreases with the number of destage tasks currently being handled by the disk(s), to ensure that the disk's task cue is not unnecessarily congested by destage tasks, and to allow fetch tasks to be delegated to the disk if the amount of dirty data in the cache allows. It should be noted that the extent of the priority given to the delegation of fetch tasks to the disk(s) in accordance with some embodiments of the present invention, may be generally associated with the ratio between the amount of dirty data currently in the cache and the dirty data threshold and with the number of destage tasks currently being handled by the disk(s), and that the priority given to the delegation of fetch tasks may be generally maintained unless, for example, the cache is substantially approaching dirty data overflow.

It should be noted that the LUT shown in FIG. 2 is exemplary in nature and that various details in the table may be modified. For example, the number and size of the segments relating to the ratio between the amount of dirty data currently in the cache(s) and the dirty data threshold may be modified and the maximum number of tasks which the disk(s) may be allowed to handle simultaneously may be modified. Additionally, it should be noted that the present invention is not limited to the numbers specific in the LUT shown in FIG. 2 for the shown combinations of ratio and the number of destage tasks handled by the disk(s).

Figure 3A:
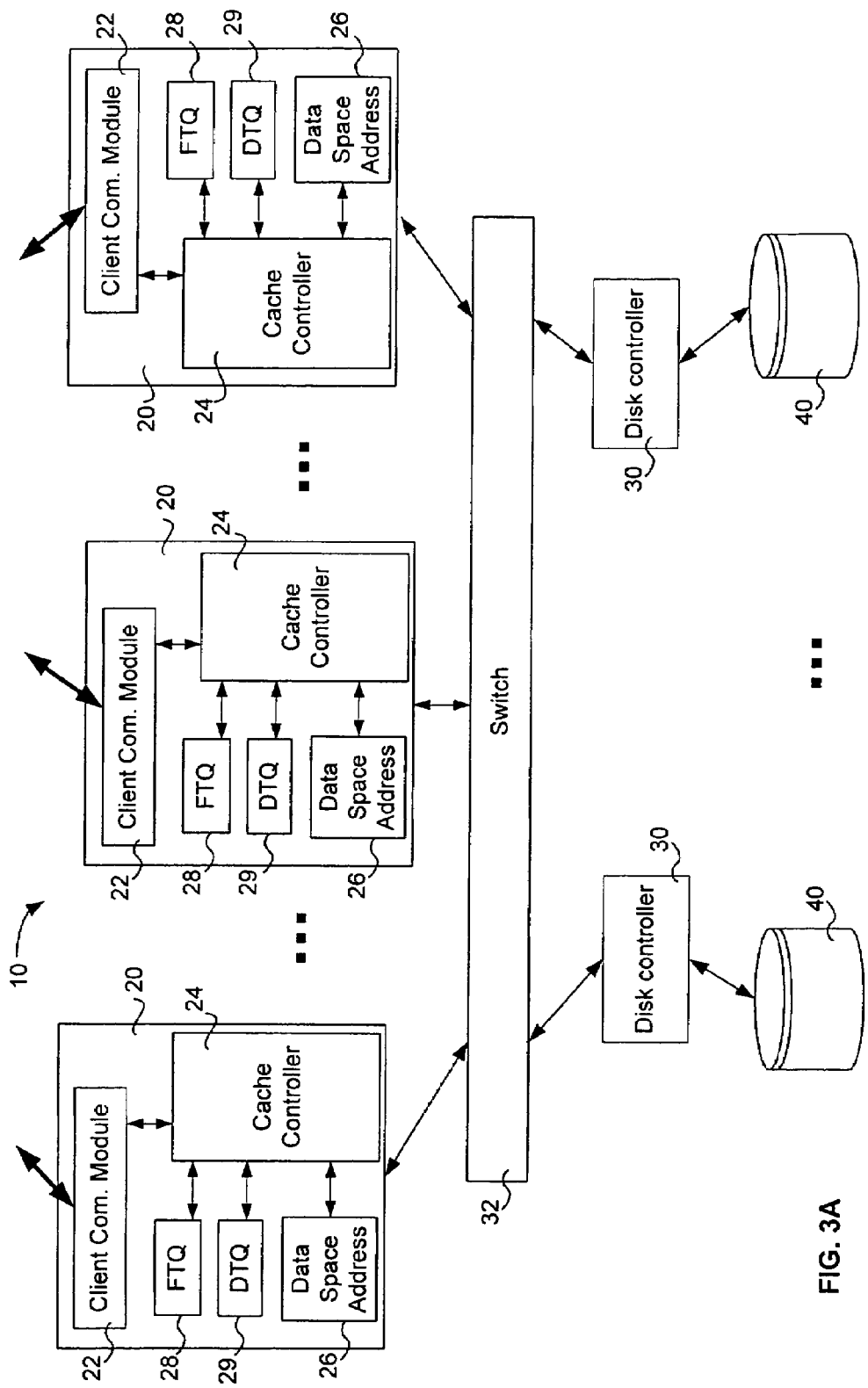
FIG. 3A is a block diagram illustration of a block diagram illustration of a mass-storage system including disk controllers, as part of some embodiments of the present invention.

Reference is now made to FIG. 3A, which is a block diagram illustration of a mass-storage system including disk controllers, as part of some embodiments of the present invention. Additional reference is now made to FIG. 3B, which is a block diagram illustration of a mass-storage system including a disk controller, as part of further embodiments of the present invention. As part of some embodiments of the present invention, a mass-storage system 10 may include one or more cache storage devices 20, a disk controller(s) 30 and one more disk 40. Each of the cache device 20 may be associated with one or more disks 40, for example, each cache 20 may be associated with two or more disks.

In accordance with some embodiment of the present invention, the mass storage system 10 may include one or more switches 32 which may be used to couple the cache(s) 20 to the disk controllers 30. In accordance with some embodiments of the present invention the switch(es) 32 may be used to direct traffic from the cache(s) 20 to the appropriate disk controller 30 and from there to the appropriate disk 40, and in the other direction, from the disk 40 through the disk controller 30 to the appropriate cache 20. In accordance with an exemplary embodiment of the present invention, each disk controller 30 may be associated with a certain disk 40, and one or more of the cache devices 20 may be adapted to communicate through the switch 32 with more than one disk controller 30, such that the one or more cache devices 20 are thus able to interact with more than one disk device 40. It should be noted, that the above configuration of the mass-storage system is exemplary in nature, and that as part of some embodiments of the present invention, the mass-storage system 10 may be otherwise configured and may, for example, include additional components.

As part of some embodiments of the present invention, the cache(s) 20 may include a host communication module 22 which may be adapted to enable communications between the cache(s) 20 and the hosts and vice-versa. The communications with the hosts may include the receipt of service requests from the hosts and the transmission of responses to the service requests. The cache(s) 20 may further include a cache controller 24. As part of some embodiments, the cache controller 24 may be adapted to manage the operation of the cache's components. In addition the cache(s) 20 may include a data space address 26. The data space address 26 may be used to store data within the cache 20. The data space address 26 may be used to substantially temporarily store data within the storage system 10, for example, as a buffer for improving the performance of the storage system 10.

As part of some embodiments of the present invention, the cache(s) 20 may receive various service requests, for example, read and/or write requests, from various sources from within the mass-storage system 10, for example, from one of the other caches, or from outside the storage system 10, for example, from a host (not shown) associated with the storage system 10. As part of further embodiments of the present invention, the cache controller 24 may generate fetch and destage tasks as part of the servicing the service requests.

As part of some embodiments of the present invention, the fetch tasks may be managed in the cache 20 within a fetch task queue 28, and the destage tasks may be managed in the cache within a destage task queue 29. In accordance with some embodiments of the present invention, the cache controller 24 may be configured to utilize various algorithms and task queue management techniques in order to manage the cache's 20 task queues. It should be noted that, for the management of the tasks queues within the cache, the present invention is not limited to the use of any particular task queue management algorithms and task queue management techniques in the cache and may be operable with any algorithms and task queue management techniques known in the present or yet to be devised in the future.

Figure 3B:
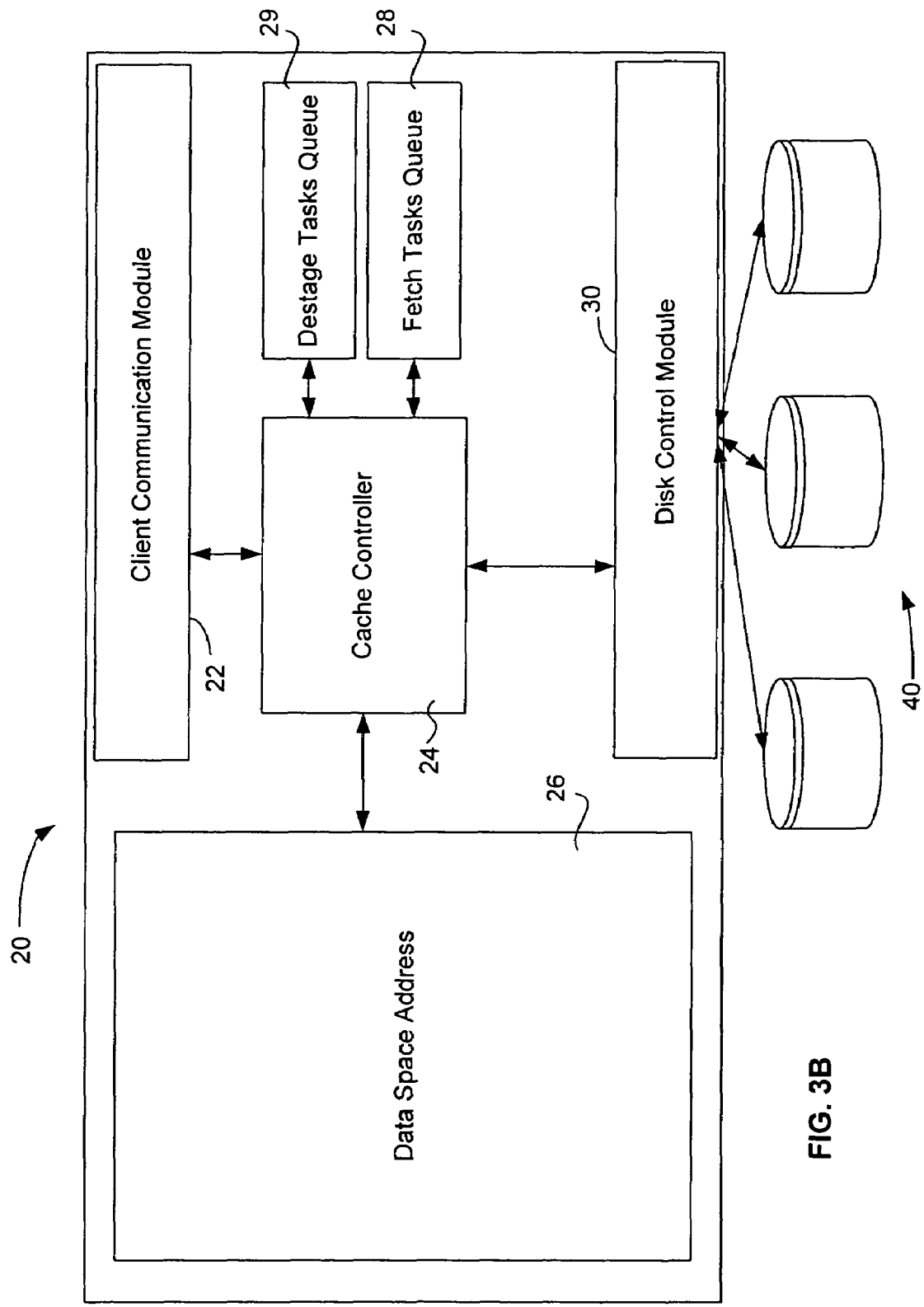
FIG. 3B is a block diagram illustration of a block diagram illustration of a mass-storage system including a disk controller, as part of further embodiments of the present invention.

In accordance with some embodiments of the present invention, the mass-storage system 10 may include a disk controller 30 (FIG. 3A) or a disk control module (FIG. 3B). In accordance with some embodiments of the present invention, the disk controller 30 or the disk control module 30 may be operatively connected to the cache(s) 20 and to the disk(s) 40. In accordance with further embodiments of the present invention, the disk controller or the disk control module 30 may be adapted to relay communications between the cache(s) 20 and the disk(s) 40 (in both directions), either directly, or through a switch 32. In accordance with further embodiments of the present invention, the disk controller or disk control module 30 may be further adapted to control the relay of communications between the cache(s) 20 and the disk(s) 40 (in both directions), and to obtain data relating to the communications being relayed, for example, by extracting the desired data from within the communications (for example, from the headers of the communications).

In accordance with some embodiments of the present invention, the disk controller or disk control module 30 may be adapted to manage some aspects of the operation of the disk(s) 40 within the mass-storage system 10. In accordance with further embodiments of the present invention, the disk controller or disk control module 30 may be adapted to manage the delegation of tasks to the disk(s) 40 as will be discussed in greater detail below.

Furthermore, it should be noted that, in accordance with further embodiments of the present invention, the disk controller or disk controller 30 may not be utilized to interfere with the management of the task queues within the cache(s) 20 nor within the disk(s) 40. Rather, in accordance with some embodiments of the present invention, the disk controller or disk control module 30 may be adapted to determine whether the next task to be delegated to the disk(s) 40 should be a fetch task or a destage task, and in accordance with further embodiments of the present invention, what number of fetch and/or destage tasks that should be delegated.

In accordance with some embodiments of the present invention, the disk controller 30 may be implemented, as is shown in FIG. 3A, as a separate component in-between one or more of the cache(s) 20 and the disk(s) 40, for example, the disk(s) that are associated with a certain cache or with a certain group of caches 20. However, the present invention is not limited to any particular implementation of the disk controller 30, and, for example, as is shown in FIG. 3B, the disk controller 30 may be implemented as part of the cache 20, either as a separate disk control module 30 or, for example, as part of the cache controller 24.

Figure 4:
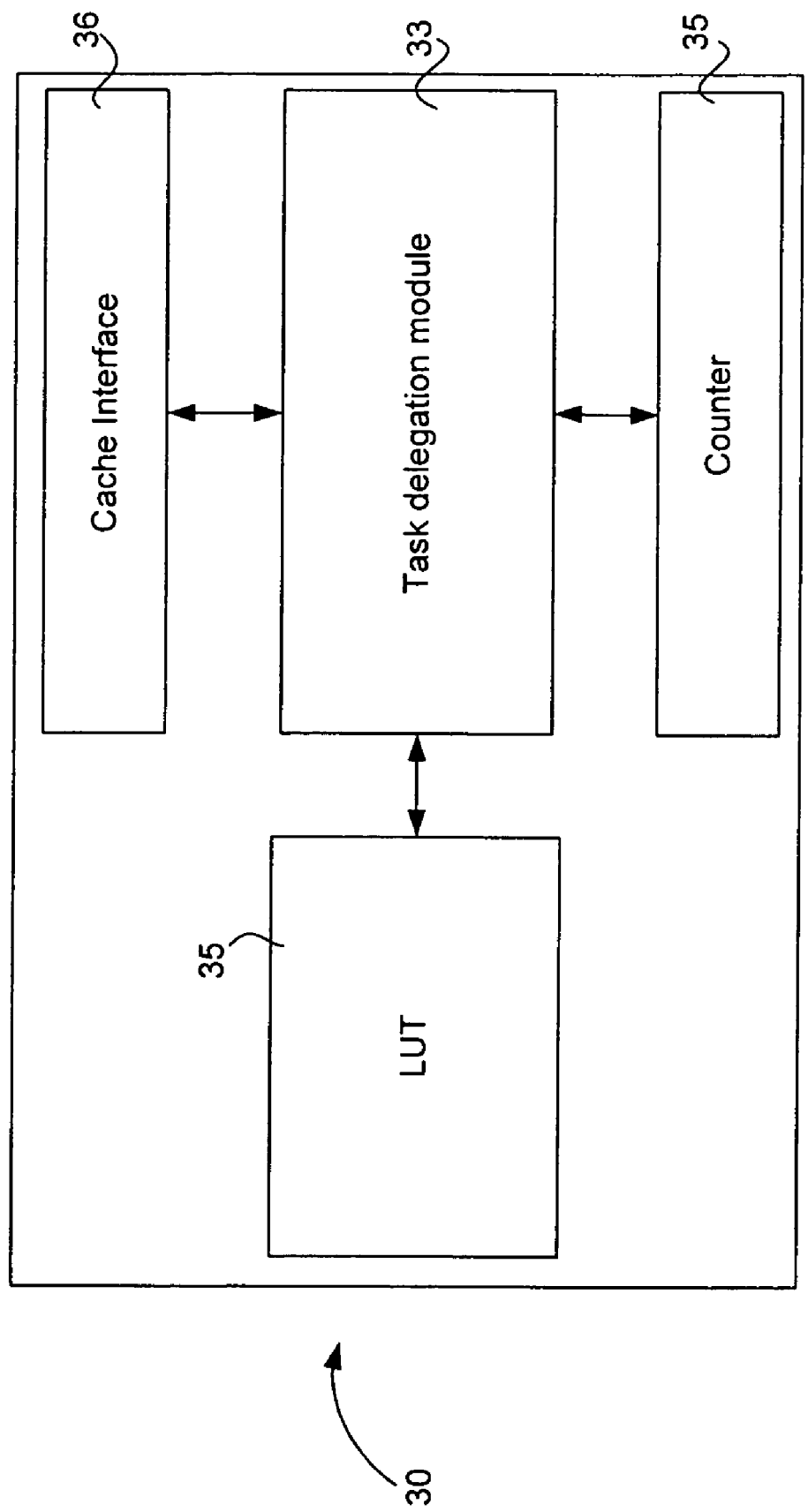
FIG. 4 is a block diagram illustration of a block diagram of a disk controller for managing the delegation of tasks to the disk, in accordance with some embodiments of the present invention.

Reference is now made to FIG. 4, which is a block diagram of a disk controller for managing the delegation of tasks to the disk, in accordance with some embodiments of the present invention. In accordance with some embodiments of the present invention, the disk controller 30 may include a task delegation module 33, a look up table (LUT) 34 and a counter 35. Additionally, in accordance with further embodiments of the present invention, the disk controller may include a cache interface 36.

In accordance with some embodiments of the present invention, whenever one or more tasks are to be delegated to the disk(s) 40, the task delegation module 33 may be adapted to determine whether a fetch task or a destage task should be delegated to the disk(s) 40. In accordance with further embodiments of the present invention, the task delegation module 33 may be further adapted to determine how many destage tasks should be delegated to the disk(s) 40, as well as to manage other aspects of the operation of the disk controller 30. Typically, in accordance with some embodiments of the present invention, up-to one fetch task may be delegated to the disk as part of each task delegation operation or iteration (whenever a task or tasks is/are to be delegated to the disk), however, it should be noted that the present invention is not limited in this respect, and in accordance with further embodiments of the present invention, the task delegation controller 33 may decide to delegate one or more destage tasks and/or one or more fetch tasks as part of each task delegation operation or iteration. The process of determining which task should be delegated and what number of each of the tasks should be delegated to the disk(s), has been discussed in detail hereinabove with reference to some embodiments of the present invention. Below, an exemplary process of determining which task should be delegated to the disk(s) shall be discussed to point out some additional aspects of some embodiments of the present invention.

In accordance with some embodiments of the present invention, the task delegation module 33 may be operatively connected to the counter 35. In accordance with some embodiments of the present invention, the counter 35 may be adapted to count the number of destage tasks currently being handled by the disk(s) 40. In addition, the counter 35 may optionally also be adapted to count the number of fetch tasks currently being handled by the disk(s) 40. Thus, at any point in time, the counter 35 may be able to provide data corresponding to the number of destage tasks currently being handled by the disk(s) 40, and optionally, the counter 35 may also be able to provide data relating to the number of fetch tasks currently being handled by the disk(s) 40 and data relating to the total number of tasks being handled by the disk(s) 40.

For example, in accordance with some embodiments of the present invention, whenever a task (destage or fetch) is delegated to the disk(s) 40, the task delegation module 33, for example, may be configured to update the counter 35 and may inform the counter 35 what kind of task (fetch or destage) is being delegated. Additionally, the task delegation module 33 or any other component of the disk controller 30 may be configured to update the counter 35 whenever an acknowledgement, in case of a destage task, or a response, in case of a fetch task, is received at the disk controller 30. Accordingly, in accordance with some embodiments of the present invention, the counter 35 may be adapted to count the number of tasks currently being handled by the disk(s) 40. For example, in accordance with some embodiments of the present invention, the counter 35 may be adapted to increment the number of destage tasks being handled by the disk(s) whenever a destage task is delegated to the disk(s), and may decrement the number of destage tasks being handled by the disk(s) 40 upon receiving an indication that an acknowledgement has been received from the disk(s) 40 to indicate that the data associated with the destage task has been stored in the disk(s) 40. Similarly, the counter 35 may be adapted to increment the number of fetch tasks being handled by the disk(s) 40 whenever a fetch task is delegated to the disk(s) 40, and may decrement the number of destage tasks being handled by the disk(s) 40 upon receiving an indication that the data associated with the fetch tasks has been fetched from the disk(s) 40. The destage acknowledgement and the data fetched from the disk(s) 40 may be received at the disk controller 30 en-route to its destination (for example, the cache and/or one of the hosts) and the disk controller's 30 task delegation module 33 may update the counter 35.

In accordance with some embodiments of the present invention, the maximum number of tasks (fetch and/or destage) which the disk(s) 40 is allowed to handle may be fixed and predefined (e.g. 8 tasks or 16 tasks) and this number may be programmed into the task delegation module 33 or included in the LUT 34. In accordance with some embodiments of the present invention, for each entry relating to a specific ratio between an amount of dirty data in the cache and a dirty data threshold, the LUT 34 may include a plurality of subentries. Each subentry in the LUT may relate to a certain number (one or more) of destage tasks which are being handled by the disk(s). Pending destage tasks which are being handled by the disk(s) may include pending destage tasks which have not yet been acknowledged by the disk, including destage tasks that are currently being processed and destage tasks that are awaiting to be processed by the disk.

In accordance with further embodiments of the present invention, for each subentry relating to a certain number of destage tasks which are being handled by the disk, the LUT 34 may include an entry relating to a certain number of destage tasks that should be delegated to the disk(s) 40. Thus, in accordance with some embodiments of the present invention, for each entry relating to a certain ratio between an amount of dirty data in the cache and a dirty data threshold, the LUT may include two or more subentries relating to the number of destage tasks being handled by the disk. For example, as is shown in the exemplary embodiment illustrated in FIG. 2, for each of the entries relating to a ratio of 0%-25%; 25%-50%; 50%-75%; and 75%-100% between an amount of dirty data in the cache and a dirty data threshold, the LUT includes four subentries, each relating to a different number (from 0 to 3) of destage tasks being handled by the disk. In accordance with further embodiments of the present invention, for each subentry, the LUT may provide the corresponding number of destage tasks that should be delegated to the disk(s) 40 (on top of the destage task(s) already being handled by the disk(s) 40. For example, as is shown in the exemplary embodiment illustrated in FIG. 2, in accordance with the LUT, for a ratio of 25%-50% between an amount of dirty data currently in the cache and a dirty data threshold and 0 destage tasks currently being handled by the disk(s), the LUT may provide the corresponding number of destage tasks that should be delegated to the disks, which is this in particular case—one.

In accordance with some embodiments of the present invention, the number of destage tasks that the disk may be allowed to handle simultaneously, i.e., the number of tasks which are being processed by the disk(s) 40 (e.g. one) plus the number of pending tasks in the disk(s)'s 40 task queue which are awaiting to be processed, may range from 0 (zero) and upwards, but may not exceed a predefined threshold relating to the maximum number of tasks (destage and/or fetch) which are allowed in the disk(s)'s 40 tasks queue, and which corresponds to the maximum number of tasks which the disk(s) is (are) allowed to be handling at any given point in time.

In accordance with some embodiments of the present invention, whenever one or more tasks are to be delegated to the disk(s) 40, the task delegation module 32 may be adapted to obtain from the cache(s) 20 data relating to the amount of dirty data currently in the cache(s) 20 or data relating to the ratio between the amount of dirty data currently in the cache and the (current) dirty data threshold. In accordance with an alternative embodiment of the present invention, the task delegation module 32 may be adapted to routinely receive data relating to the ratio between the amount of dirty data currently in the cache and the dirty data threshold and when the task delegation module 33 needs to make a decision with regard to which task(s) should be delegated to the disk(s) 40, the task delegation module 33 may be configured to use the most updated data relating to the ratio between the amount of dirty data currently in the cache and the (current) dirty data threshold rather then to obtain such data whenever a delegation is required. In addition, whenever one or more tasks are to be delegated to the disk(s) 40, the task delegation module 33 may be adapted to obtain from the counter 35 data relating to the number of destage tasks currently being handled by the disk(s) 40.

It should be noted that in accordance with further embodiments of the present invention, whenever the disk controller 30 is required to delegate a task or tasks, the task delegation module 33 may be adapted to obtain additional data, either from the cache(s) 20 or from the counter 35, for example, as well as from other sources. For example, as mentioned above, the task delegation module 33 may obtain from the counter 35, in addition to the data relating to the number of destage tasks currently being handled by the disk(s) 40, data relating to the number of fetch tasks currently being handled by the disk(s) 40 and/or data relating to the total amount of tasks currently being handled by the disk(s). It should also be noted that the additional data, which may be obtained by the task delegation module 33 may be used, in accordance with some embodiments of the present invention, to determine which task(s) should be delegated to the disk(s) and the number of the (destage) tasks to be delegated.

Thus, in accordance with some embodiments of the present invention, once the task delegation module 33 has obtained the data relating to the ratio between the amount of dirty data currently in the cache and a dirty data threshold and the data relating to the number of destage tasks currently being handled by the disk(s) 40, the task delegation module 33 may consult the LUT 34 to determine which task(s) to delegate to the disk as discussed above, and in case it is determined that more than one (destage) task should be delegated, the task delegation module 33 may determine what number of which kind of task should be delegated to the disk(s) 40.

In accordance with some embodiments of the present invention, the disk controller 30 may be adapted to delegate to the disk(s) 40 fetch task(s) unless the task delegation module 32 determines in accordance with the amount of dirty data currently in the cache(s) 20 and in accordance with the number of destage tasks currently being handled by the disk(s) 40, that one or more destage tasks should be delegated to the disk(s) 40, either in alternative to the fetch task(s) or in combination with one or more fetch task(s). In other words, in accordance with some embodiments of the present invention, the disk controller 30 may be adapted to delegate to the disk(s) 40 fetch task(s) unless in accordance with the ratio between the amount of dirty data currently in the cache(s) 20 and the (current) dirty data threshold and in accordance with the number of destage tasks currently being handled by the disk(s), the task delegation module 33 determines one or more destage tasks that should be delegated to the disk(s) 40, either in alternative to the fetch task(s) or in combination with one or more fetch task(s).

In accordance with further embodiments of the present invention, the task delegation module 32 may be adapted to determine what number of fetch tasks and what number of destage tasks should be delegated to the disk in accordance with the difference (or the lack of thereof) between the number of destage tasks currently being handled by the cache(s) 20 and the number of the destage tasks that should be handled by the cache determined as discussed above. In accordance with some embodiments of the present invention, the task delegation module 32 may be adapted to determine the number of the fetch tasks and/or of the destage tasks that should be delegated to the disk(s) 40, such that the number of destage tasks that will be handled by the disk(s) 40 once the tasks are delegated is equal to the number of destage tasks that should be handled by the disk(s), as determined by the task delegation module 33 as discussed above.

However, it should be noted that the above description of the disk controller 30 shown in FIG. 4 is exemplary in nature, and that in accordance with further embodiments of the present invention, one or more of the components shown in FIG. 4 and described above as being part of the disk controller 30 may be not be included or may not be utilized as part of various implementations of the disk controller 30. For example, in case the disk controller 30 is implemented within the cache 20, the cache interface may not be included in the disk controller. In addition, in accordance with further embodiments, additional components may be included in the disk controller 30, and may provide additional and/or enhanced functionalities and/or improved performance.

Figure 5:
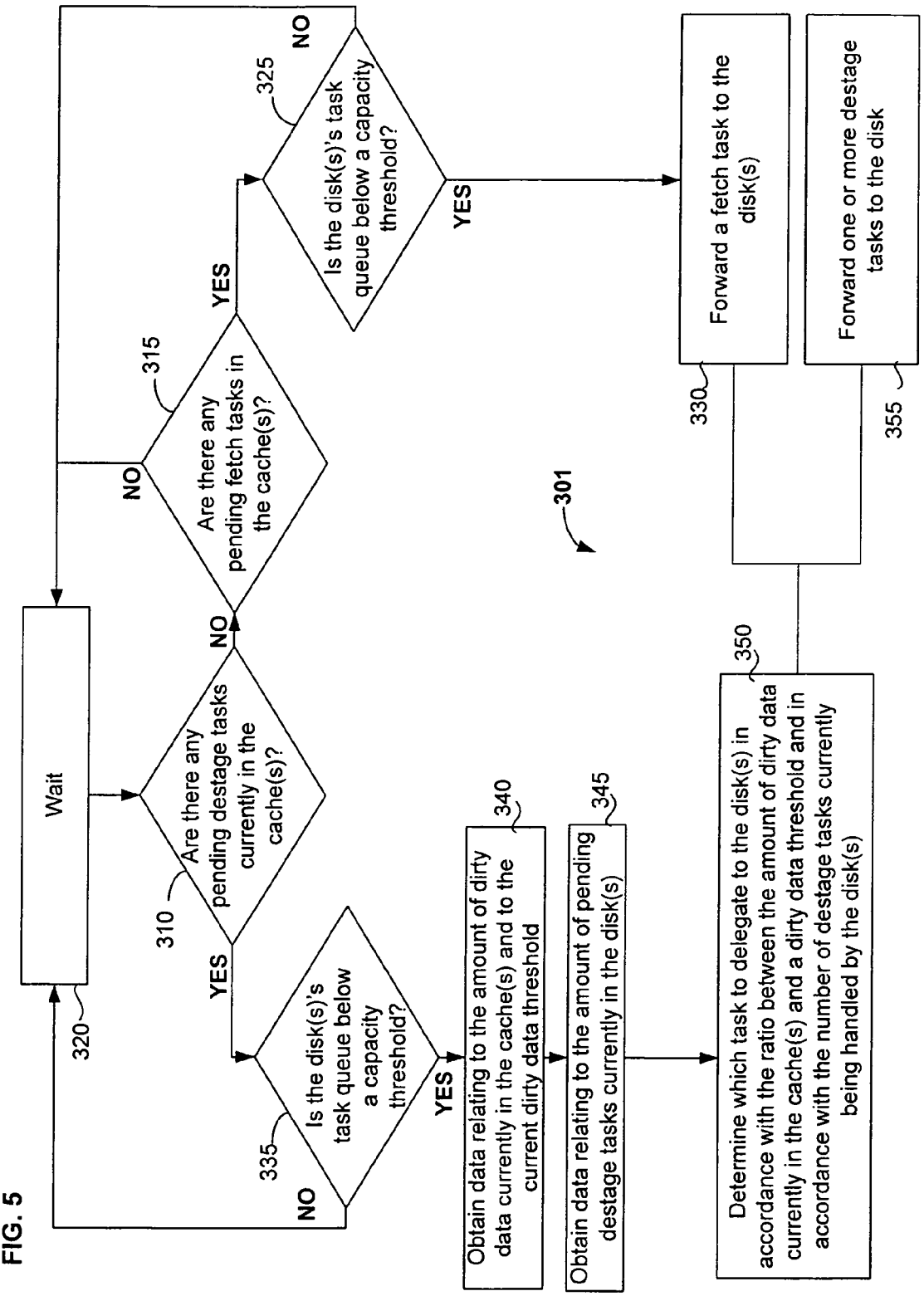
FIG. 5 is a flowchart illustration of a method of managing the delegation of tasks from a cache to a disk, in accordance with some embodiments of the present invention.

Reference is now made to FIG. 5, which is a flowchart illustration of a method of managing the delegation of tasks from a cache to a disk, in accordance with some embodiments of the present invention. In accordance with some embodiments of the present invention, initially, the cache(s)'s destage task queue may be checked to determine whether there are any pending destage tasks currently in the cache (block 310). In case it is determined that the cache(s)'s destage task queue is empty and that there are no pending destage tasks in the cache(s)'s destage tasks queue, the cache may check if there are any pending fetch tasks in the cache (block 315). If it is determined that both the destage and fetch tasks queues are empty and that there are not tasks in the cache which may be delegated to the disk(s), the process may be reset after a certain period of time (block 320), for example, after a predetermined period of time, or until a certain predetermined event occurs, such as, for example, until a new task is generated by the cache(s).

However, in accordance with some embodiments of the present invention, if at block 315 it is determined that there are pending fetch tasks in the cache, the task queues of the relevant disk(s) may be checked to determine whether it is below a capacity threshold (block 325), and if it is determined that the disk(s)'s task queue is below the predetermined capacity threshold, one or more fetch tasks may be delegated to the disk(s) (block 330). In case it is determined at block 325 that the number of tasks in the disk(s)'s task queue is above or is equal to the disk(s)'s predetermined capacity threshold, the process may be reset after a certain period of time (block 320), for example, until the number of tasks in the disk(s)'s task queue drops below the predetermined capacity threshold.

In accordance with some embodiments, if, however, at block 310 it is determined that there are pending destage tasks in the cache(s), the disk(s)'s task queue may be checked to determine whether it is below the capacity threshold (block 335). If it is determined that the disk(s)'s task queue is above or is equal to the disk(s)'s predetermined capacity threshold, the process may be reset after a certain period of time (block 320).

If at block 335 it is determined, however, that the disk(s)'s task queue is below the predetermined capacity threshold, data relating to the amount of dirty data currently in the cache and to the current dirty data threshold may be obtained (block 340), for example, by the disk controller's task delegation module, and in addition, data relating to the number of pending destage tasks currently being handled by the disk may also be obtained (block 345).

Next, in accordance with some embodiments of the present invention, it may be determined which task(s) and what number of tasks should be delegated to the disk(s) in accordance with the ratio between the amount of dirty data currently in the cache and the (current) dirty data threshold and in accordance with the number of destage tasks currently being handled by the disk(s) (block 350). Finally, one or more destage task(s) (block 355) and/or a fetch task (block 330) may be delegated to the disk(s) in accordance with the decision in block 350.

In accordance with yet further embodiments of the present invention, as part of determining which task(s) to delegate to the disk(s) in block 350, fetch task are to be delegated to the disk(s), unless it is determined in accordance with the data relating to the ratio between the amount of dirty data currently in the cache(s) and the (current) dirty data threshold and in accordance with the data relating to the number of destage tasks currently being handled by the disk(s) that one or more destage tasks should be delegated to the disk(s). Furthermore, in accordance with some embodiments of the present invention, the number of fetch tasks (typically one, but possibly more) and the number of destage tasks (one or more) to be delegated to the disk(s) may be determined in accordance with the data relating to the ratio between the amount of dirty data currently in the cache(s) and the dirty data threshold and in accordance with the data relating to the number of destage tasks currently being handled by the disk(s).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for managing tasks of a disk, comprising:
   formulating a plurality of ranges of a ratio between an amount of dirty data currently in a cache and a predetermined dirty data threshold, the ranges including all values of the ratio between 0% and 100%, at least one range having a lower bound greater than 0% and an upper bound less than 100%;
   formulating numbers of destage tasks currently being handled by the disk;
   for each pair of a given range and a given number of destage tasks, formulating a correspondence to a respective predetermined number of destage tasks to be delegated to the disk;
   in response to determining a range of the ratio for the cache and a number of destage tasks currently being handled by the disk, delegating a number of destage tasks to the disk according to the correspondence; and
   if the number of destage tasks delegated according to the correspondence is zero, performing one or more fetches from the disk.

2. The method according to claim 1, wherein the number of destage tasks delegated to the disk generally increases with the ratio between the amount of dirty data currently in the cache and the predetermined dirty data threshold, and generally decreases with the number of destage tasks currently being handled by the disk.

3. The method according to claim 1, wherein the predetermined dirty data threshold corresponds to a maximum amount of dirty data allowed in the cache.

4. The method according to claim 1, wherein the predetermined dirty data threshold is a variable value which is dependent upon a total amount of cache storage space and upon a percentage of dirty data allowed out of the total amount of cache storage space.

5. The method according to claim 1, wherein the plurality of ranges comprises monotonically increasing ranges.

6. The method according to claim 1, wherein the plurality of ranges comprises monotonically decreasing ranges.

* * * * *